United States Patent
Lucia et al.

(10) Patent No.: US 12,541,349 B2
(45) Date of Patent: Feb. 3, 2026

(54) ENERGY-MINIMAL DATAFLOW ARCHITECTURE WITH PROGRAMMABLE ON-CHIP NETWORK

(71) Applicant: CARNEGIE MELLON UNIVERSITY, Pittsburgh, PA (US)

(72) Inventors: Brandon Lucia, Pittsburgh, PA (US); Nathan Beckmann, Pittsburgh, PA (US); Graham Gobieski, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 18/553,670

(22) PCT Filed: Aug. 29, 2023

(86) PCT No.: PCT/US2023/031348
§ 371 (c)(1),
(2) Date: Oct. 2, 2023

(87) PCT Pub. No.: WO2024/049791
PCT Pub. Date: Mar. 7, 2024

(65) Prior Publication Data
US 2025/0190189 A1 Jun. 12, 2025

Related U.S. Application Data

(60) Provisional application No. 63/403,422, filed on Sep. 2, 2022.

(51) Int. Cl.
*G06F 9/44* (2018.01)
*G06F 8/41* (2018.01)

(52) U.S. Cl.
CPC .................................... *G06F 8/41* (2013.01)

(58) Field of Classification Search
CPC .................................. G06F 8/41; G06F 8/443
See application file for complete search history.

(56) References Cited

U.S. PATENT DOCUMENTS

| | | | |
|---|---|---|---|
| 10,469,397 B2* | 11/2019 | Fleming | H04L 49/3027 |
| 10,515,049 B1 | 12/2019 | Fleming | |
| 11,029,958 B1* | 6/2021 | Zhang | G06F 9/3016 |
| 2021/0373867 A1 | 12/2021 | Chen | |
| 2022/0164189 A1 | 5/2022 | Balasubramanian | |

OTHER PUBLICATIONS

International Search Report and Written Opinion for International Application No. PCT/US23/31348, mailing date Jan. 8, 2024, 16 pages.

* cited by examiner

*Primary Examiner* — Chuck O Kendall
(74) *Attorney, Agent, or Firm* — KDW FIRM PLLC (57) ABSTRACT

Disclosed herein is a co-designed compiler and CGRA architecture that achieves both high programmability and extreme energy efficiency. The architecture includes a rich set of control-flow operators that support arbitrary control flow and memory access on the CGRA fabric. The architecture is able to realize both energy and area savings over prior art implementations by offloading most control operations into a programmable on-chip network where they can re-use existing network switches.

16 Claims, 8 Drawing Sheets

```
1   cxn = A_cxn
2   forever:
3       A_ready = D_ready = 0
4       if A_valid && D_valid: # wait for A and D
5           # if D is true, pass through A;
6           # else discard A
7           noc_valid = D
8           A_ready = D_ready = noc_ready || !D
9           if D: wait for noc_ready
```

*(a) Steer (True flavor).*

```
1   forever:
2       # begin in Initial state
3       if A_valid:
4           cxn = A_cxn              # pass through A
5           noc_valid = A_valid
6           D_ready = A_ready = noc_ready
7           B_ready = xxx             # don't care
8       wait for noc_ready
9       # transition to Block state
10      do until D_valid && !D:
11          cxn = B_cxn              # pass through B
12          noc_valid = B_valid
13          D_ready = B_ready = noc_ready
14          A_ready = false          # hold A at input
15          wait for noc_ready
```

FIG. 8

ENERGY-MINIMAL DATAFLOW ARCHITECTURE WITH PROGRAMMABLE ON-CHIP NETWORK

RELATED APPLICATIONS

This application is a filing under 35 U.S.C. § 371 of PCT application PCT/US23/31348, filed Aug. 29, 2023, which claims the benefit of U.S. Provisional Patent Application No. 63/403,422, filed on Sep. 2, 2022, entitled "An Energy-Minimal Dataflow Architecture With Programmable On-Chip Network", the contents of these applications are incorporated herein in their entireties.

GOVERNMENT INTEREST

This invention was made with United States government support under contract CCF1815882 awarded by the National Science Foundation and contract W911NF-18-2-0218, awarded by the U.S. Army. The U.S. government has certain rights in this invention.

BACKGROUND

Recent advances in machine learning, sensor devices and embedded systems open the door to a wide range of sensing applications, such as civil-infrastructure or wilderness monitoring, public safety and security, medical devices, and chip-scale satellites. To achieve long (e.g., 5+ year) deployment lifetimes, these applications rely on on-device processing to limit off-device communication. Computing at the extreme edge calls for ultra-low-power (<1 mW), energy-minimal and programmable processing.

Application-specific integrated circuits (ASICs) are one possible solution to address the need for extreme energy efficiency. However, ASICs come with several major disadvantages. Computations in smart sensing applications are diverse, spanning deep learning, signal processing, compression, encoding, decryption, planning, control, and symbolic reasoning. Only a programmable solution can support all of these, as it is infeasible to build an ASIC for every conceivable task. Moreover, the rapid pace of change in these applications (e.g., due to new machine learning algorithms) puts specialized hardware at risk of premature obsolescence, especially in a multi-year deployment. Finally, by targeting all computations, programmable designs can achieve much greater scale than specialized designs—perhaps trillions of devices. Scale reduces device cost, makes advanced manufacturing nodes economically viable, and mitigates carbon footprint.

Figure 1:
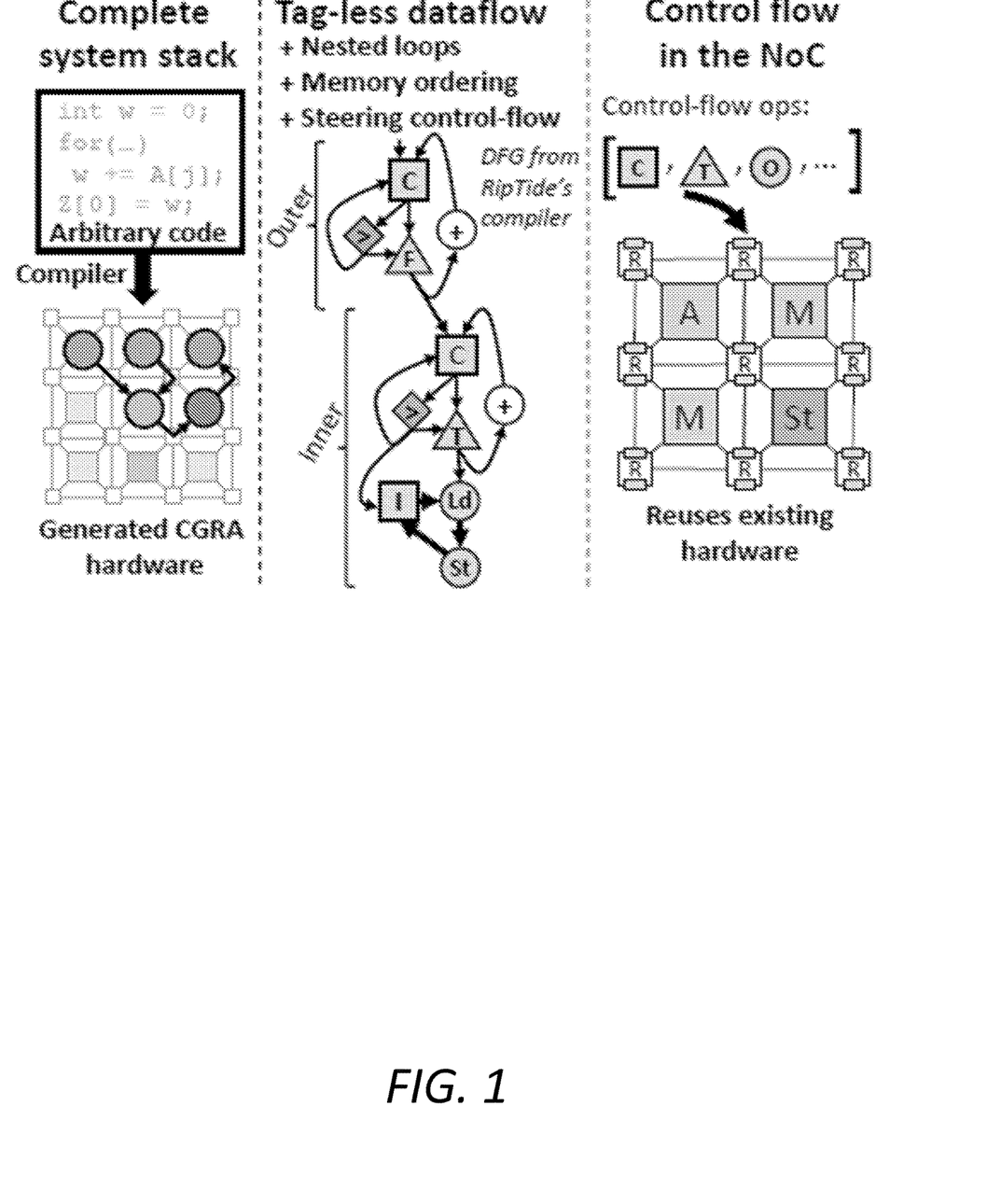
FIG. 1 is a schematic representation of a middle ear, showing ideal positioning of a cochlear implant, and, in particular, the electrode array portion of the implant.

Unfortunately, traditional programmable cores are very inefficient, typically spending only 5% to 10% of their energy on useful work. The architect's challenge is thus to reconcile generality and efficiency. Coarse-grained reconfigurable arrays (CGRAs) are both programmable and efficient. CGRAs can achieve energy efficiency competitive with ASICs while remaining programmable by software. As shown in FIG. 1, a CGRA is an array of processing elements (PEs) connected by an on-chip network (NoC). CGRAS are programmed by mapping a computation's dataflow onto the array (i.e., by assigning operations to PEs and configuring the NoC to route values between dependent operations). The efficiency of CGRAs derives from avoiding overheads intrinsic to von Neumann architectures, specifically instruction fetch/control and data buffering in a centralized register file.

In the context of ultra-low-power sensing applications, the CGRA-generation framework disclosed in U.S. patent application Ser. No. 17/572,925 was designed to minimize energy, in contrast to prior, performance-focused CGRAs. These CGRAs reduce energy by up to 5 times versus ultra-low-power von Neumann cores, and they come within 3 times the energy efficiency of ASICs.

However, according to Amdahl's Law, to achieve significant end-to-end benefits, CGRAs must benefit the vast majority of program execution. CGRAs must support a wide variety of program patterns at minimal programmer effort, and they must provide a complete compiler and hardware stack that makes it easy to convert arbitrary application code to an efficient CGRA configuration. Unfortunately, prior art CGRAs struggle to support common programming idioms efficiently, leaving significant energy savings on the table.

On the hardware side, many prior CGRAs support only simple, regular control flow (e.g., inner loops with streaming memory accesses and no data-dependent control). To support complex control flow and maximize performance, other CGRAs employ expensive hardware mechanisms (e.g., associative tags to distinguish loop iterations, large buffers to avoid deadlock, and dynamic NoC routing). In either case, energy is wasted: from extra instructions needed to implement control flow unsupported by the CGRA fabric or from inefficiency in the CGRA microarchitecture itself.

On the compiler side, mapping large computations onto a CGRA fabric is a perennial challenge. Heuristic compilation methods often fail to find a valid mapping and optimization-based methods lead to prohibitively long compilation times. Moreover, computations with irregular control flow are significantly more challenging to compile due to their large number of control operations, which significantly increase the size of the dataflow graph. To avoid these issues, hand-coded vector assembly could be used, restricting programs to primitives that map well onto a CGRA. Vector assembly sidesteps irregular control but makes programming cumbersome.

SUMMARY

Described herein is a novel design of a co-designed CGRA compiler and architecture that supports arbitrary control flow and memory access patterns without expensive hardware mechanisms. Unlike prior low-power CGRAs, the disclosed embodiments can execute arbitrary code, limited only by fabric size and routing. This saves energy by offloading more code onto the CGRA, where it executes with an order-of-magnitude less energy than a von Neumann core. Deeply nested loops are supported with data-dependent control flow and aliasing memory accesses, as commonly found in, for example, sparse linear algebra.

The benefits of the disclosed embodiments are realized by several novel aspects. First, the instruction set architecture supports complex control while minimizing energy. A steering control paradigm is adopted in which values are only routed to where they are actually needed. To support arbitrary nested control without tags, new control-flow primitives, such as the carry gate, which selects between tokens from inner and outer loops are introduced. The disclosed embodiments also optimize the common case by introducing operators for common programming idioms, such as the stream generator that generates an affine sequence for streaming memory accesses.

The disclosed embodiments offload control flow into the on-chip network. New control flow primitives are implemented without wasting energy or PEs by leveraging existing NoC switches. The insight is that a NoC switch already contains essentially all of the logic needed for steering control flow, and, with a few trivial additions, it can implement a wide range of control primitives. Mapping control-flow into the NoC frees PEs for arithmetic and memory operations, so deeply nested loops with complex control flow can be supported on a small CGRA fabric.

The disclosed compiler complies C programs to an efficient CGRA configuration. Functions written in a high-level language are compiled and novel analyses are employed to safely parallelize operations. With steering control flow and no program counter, conventional transitive reduction analysis fails to enforce all memory orderings, so path-sensitive transitive reduction to infer orderings correctly is introduced. Arbitrary control flow without associative tags is implemented by enforcing strict ordering among values, leveraging its new control operators. Programs are mapped onto the CGRA by formulating place-and-route as a Boolean satisfiability (SAT) instance or integer linear program. The SAT formulation finds configurations quickly (<3 min), while the integer linear programming (ILP) formulation yields configurations that use 4.3% less energy.

BRIEF DESCRIPTION OF THE DRAWINGS

By way of example, a specific exemplary embodiment of the disclosed system and method will now be described, with reference to the accompanying drawings, in which.

DETAILED DESCRIPTION

Disclosed herein is a compiler and microarchitecture for ultralow-power, energy-minimal CGRAs. At its core is an instruction set architecture (ISA) that supports arbitrary control flow without expensive associative tag matching. The novel compiler disclosed herein transforms programs written in high-level programming languages (e.g., C) into dataflow graphs using the ISA. It also enforces memory ordering and optimizes programs by fusing loop induction variables into single stream operators. The CGRA fabric efficiently executes compiled programs. It minimizes switching activity by assigning a single operation per PE. Additionally, it reuses hardware in the NoC to implement control-flow operations without wasting processing element (PE) resources. As a result, energy efficiency/performance is improved over prior art energy-minimal CGRAs and a ultra-low power scalar core.

As shown in FIG. 1, the invention comprises a co-designed compiler and CGRA architecture that executes programs written in a high-level language with minimal energy and high performance. New control-flow primitives to support common programming idioms, like deeply nested loops and irregular memory accesses, are introduced, while minimizing the energy overhead. Control flow is implemented in the NoC to increase utilization and ease compilation.

Instruction Set Architecture (ISA)

Figure 2:
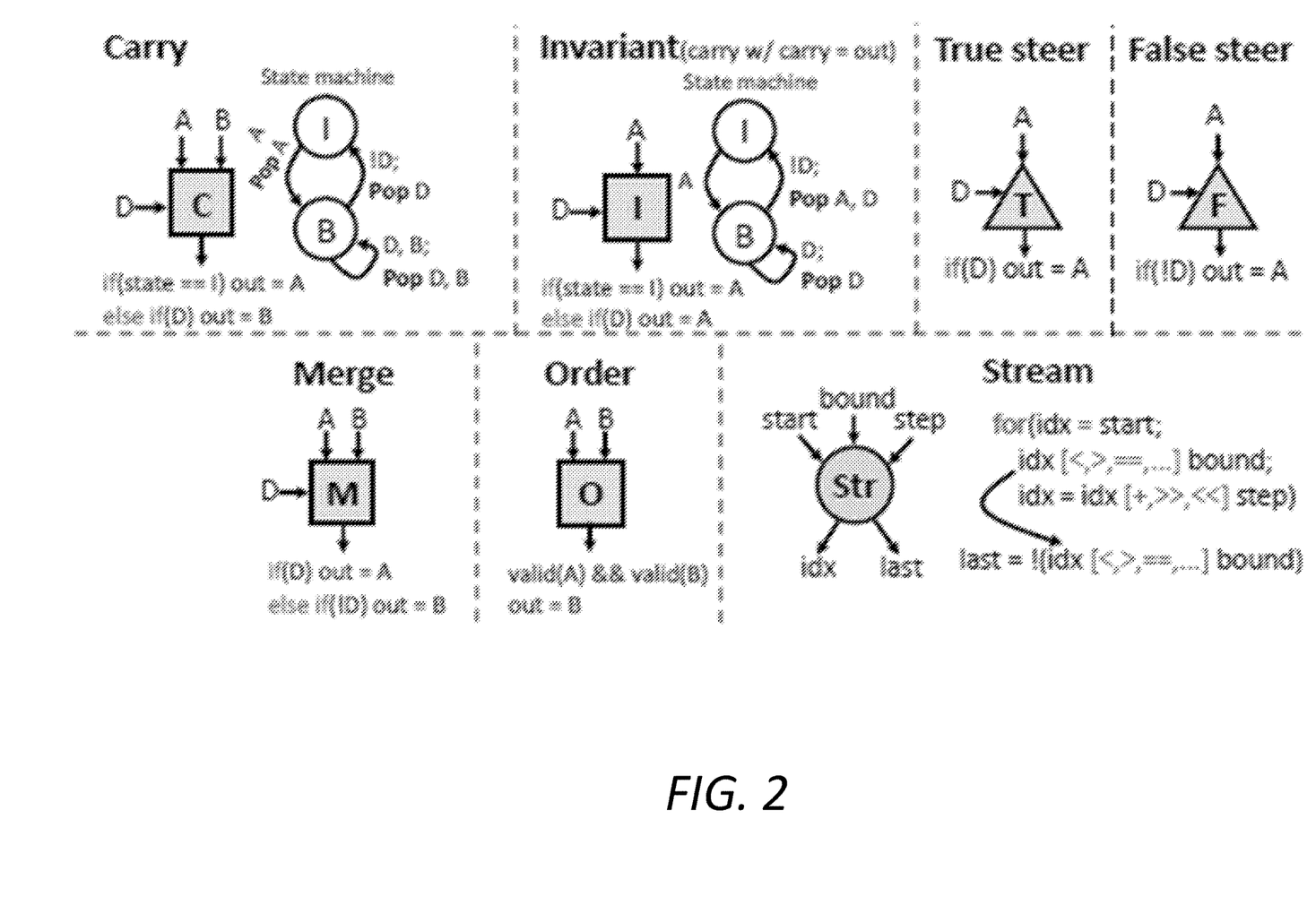
FIG. 2 is a diagram illustrating the semantics of the control-flow operators of the disclosed architecture.

A rich set of new operators are provided to support complex programs. The ISA has six categories of operators: arithmetic, multiplier, memory, control flow, synchronization, and streams. (Multiplication is split from other arithmetic because, to save area, only some PEs can perform multiplication.) The new operators are illustrated in FIG. 2. The control flow operators include Steer, Carry and Invariant. The synchronization operators include Merge and Order. A Stream operator is also provided to generate a sequence of data values.

For control flow operators, whenever a value is read, it is implied that the operator waits until a valid token arrives for that value over the NoC. Tokens are buffered at the inputs if they are not consumed or discarded.

The Steer ($\phi^{-1}$) operator comes in two flavors, True and False, and takes two inputs: a decider, D and a data input, A. If D matches the flavor, then the gate passes A through; otherwise, A is discarded. Steers are necessary to implement conditional execution, as they gate the inputs to disabled branches.

The Carry operator represents a loop-carried dependency and takes a decider, D, and two data values, A and B. Carry has the internal state machine, as shown in FIG. 2. In the Initial state, it waits for A, and then passes it through and transitions to the Block state. While in Block, if D is True, the operator passes through B. It transitions back to Initial when D is False and begins waiting for the next A value (if not already buffered at the input). Carry operators keep tokens ordered in loops, eliminating the need to tag tokens. All backedges are routed through a carry operator. By not consuming A while in Block, carry operators prevent outer loops from spawning a new inner-loop instance before the previous one has finished. (Iterations from one inner-loop may be pipelined if they are independent, but entire instances of the inner loop will be serialized.)

The Invariant operator is a variation of carry. It represents a loop invariant and can be implemented as a carry with a self-edge back to B. Invariants are used to generate a new loop-invariant token for each loop iteration.

The Merge operator enforces cross-iteration ordering by making sure that tokens from different loop iterations appear in the same order, regardless of the control path taken within by each loop iteration. The operator takes three inputs: a decider, D, and two data inputs, A and B. Merge is essentially a multiplexor that passes through either A or B, depending on D. However, it should be noted that only the value passed through is consumed.

The Order operator is used to enforce memory ordering by guaranteeing that multiple preceding operations have executed. It takes two inputs, A and B, and fires as soon as both arrive, passing B through.

The Stream operator generates a sequence of data values, which are produced by evaluating an affine function across a range of inputs. These operators are used in loops governed by affine induction variables. A stream takes three inputs: start, step, and bound. It initially sets its internal idx to start, and then begins iterating a specified arithmetic operator f as idx'=f(idx, step). A stream operator produces two output tokens per iteration: idx and a control signal last, which is False until idx reaches bound, whereupon it is True and the stream stops iterating. last is used by downstream control logic, for example, to control a carry operator for outer loops.

Compiler

Figure 3:
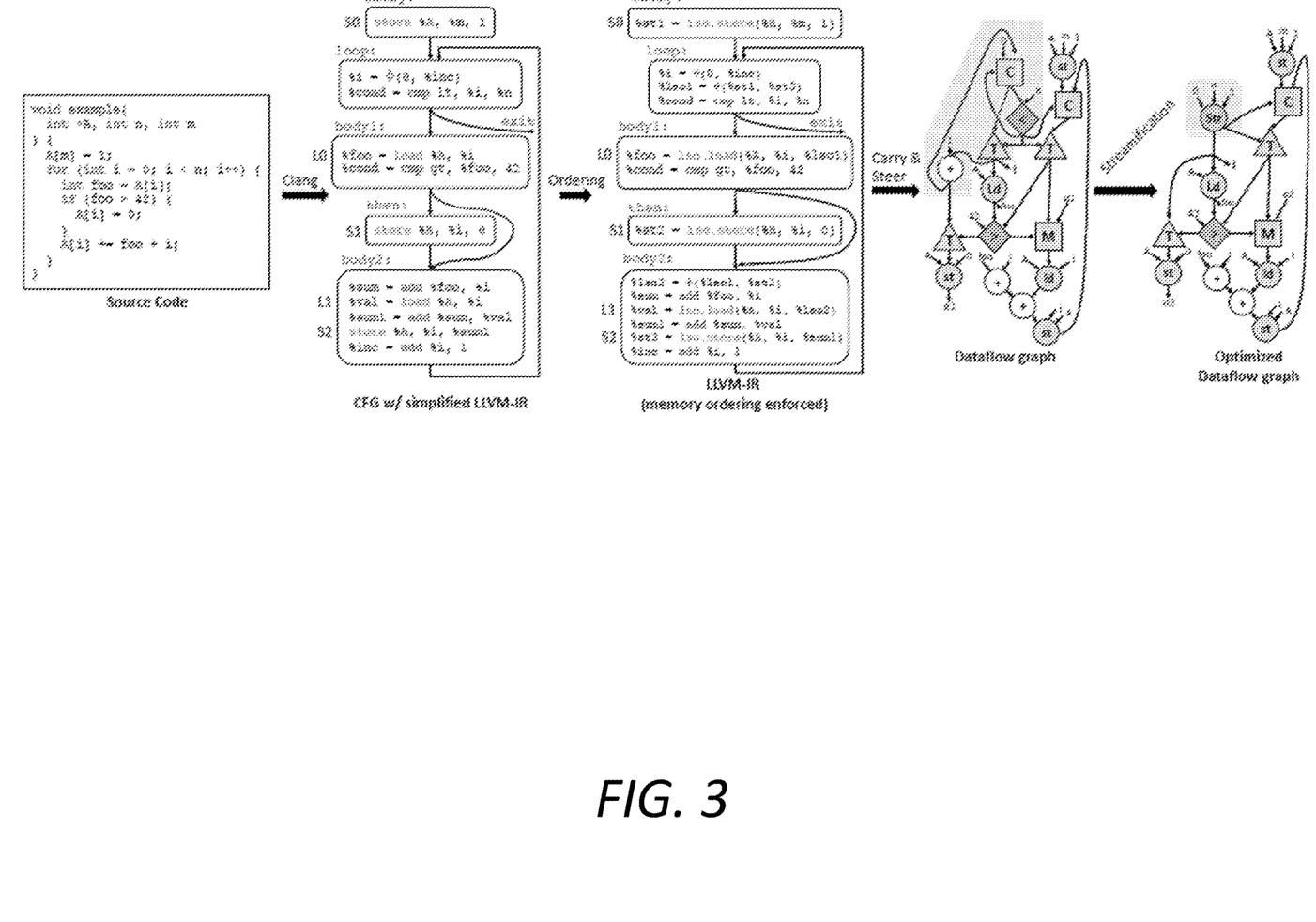
FIG. 3 schematically illustrates the front-end and middle-end components of the compiler, which takes highs-level source code and transforms it to an optimized dataflow graph.

The compiler disclosed herein compiles, optimizes, and maps high-level code to the CGRA fabric. Its compiler has a front-end, middle-end, and back-end. FIG. 3 shows the front-end and middle-end components of the compiler. The front-end compiles the high-level language to an intermediate representation (IR). In one embodiment, the compiler uses clang to compile C code to LLVM's IR. The middle-end manipulates the LLVM IR to insert control-flow operators and enforce memory ordering. It then translates the IR to a dataflow graph (DFG) representation and optimizes the DFG by transforming and fusing subgraphs. In some embodiments, the operator count can be reduced by up to 27%. The back-end takes the DFG as input and maps operators onto the CGRA, producing a configuration bitstream in minutes.

Memory-Ordering Analysis. Sequential code is mapped onto a CGRA fabric in which many operations, including memory, may execute in parallel. For correctness, some memory operations must execute in a particular order. The compiler's middle-end computes required orderings between memory operations present in the IR and adds control-flow operations to enforce those orderings.

Figure 4:
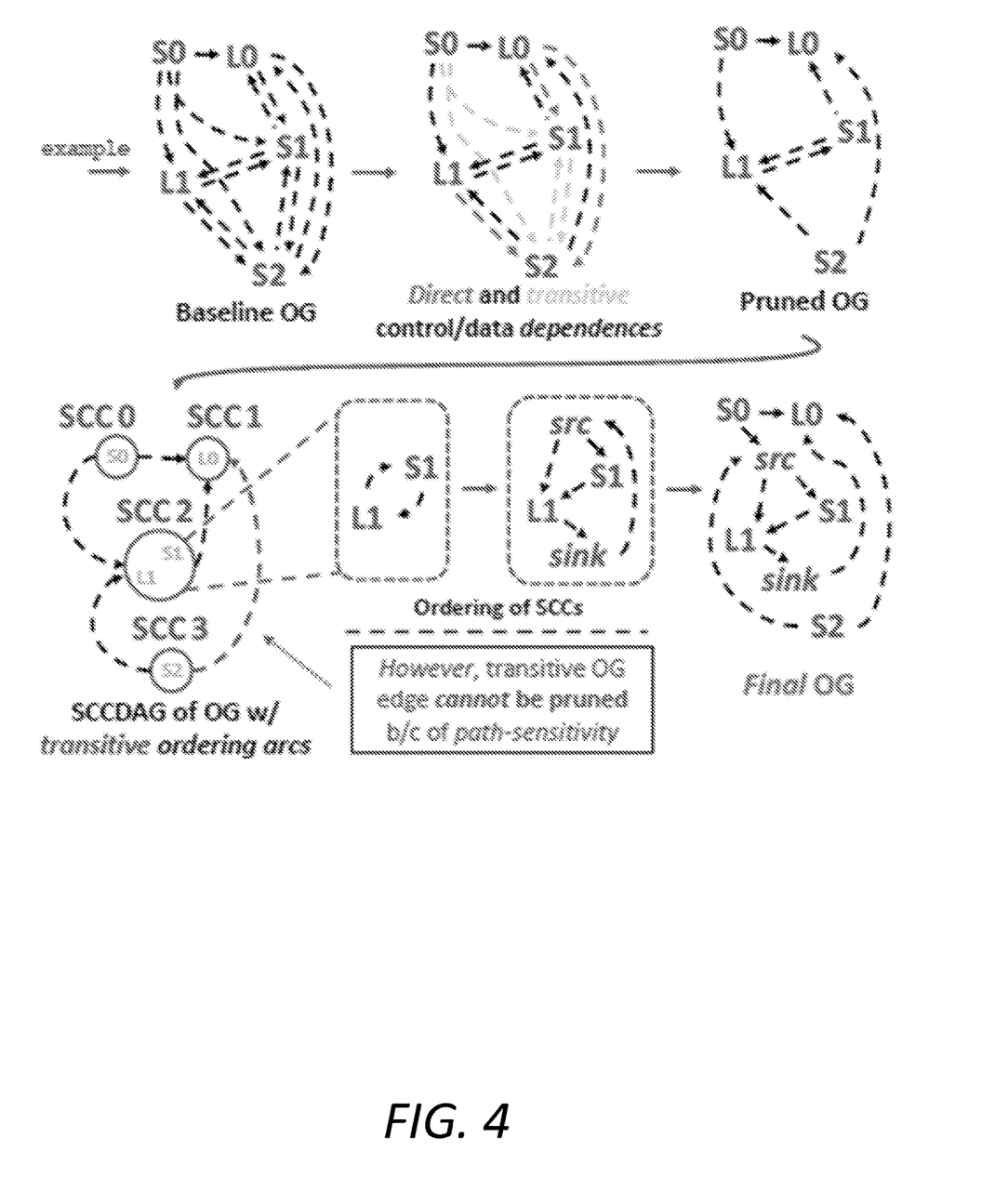
FIG. 4 illustrates the enforcement of memory ordering by the middle-end.

The first step to enforcing memory ordering is to construct an ordering graph (OG) that encodes dependences between memory operations. The compiler uses alias analysis to identify memory operations that may or must access the same memory location (i.e., alias), adding an arc between the operations in the OG accordingly. No assumptions are made regarding the alias analysis and self-dependences need not be considered because repeated instances of the same memory operation are always ordered on its CGRA fabric. FIG. 4 shows a basic, unoptimized OG in the top left for an example function.

The OG as computed can be greatly simplified (i.e., pruned). Prior work has simplified the OG with improved alias analysis and by leveraging new control flow primitives. These efforts are orthogonal to the present methodology, which simplifies the OG by eliminating redundant ordering arcs that are already enforced by data and control dependences. Data dependences are discovered by walking LLVM's definition-use (def-use) chain from source to destination and removing ordering arcs for dependent operations. For instance, in the control flow graph (CFG) from the example in FIG. 3, S2 is data-dependent on L1, so there need not be an ordering arc in the OG. This is reflected in the arc from L1 to S2 that is pruned in the OG in FIG. 4. Similarly, control dependences order some memory operations if the execution of the destination is control-dependent on the source. The CFG is analyzed to identify control dependences between memory operations and those orderings are removed from the OG. In the CFG from the example in FIG. 3, the arc from L0 to S1 in FIG. 4 is pruned using this analysis.

Two dependent memory operations are transitively ordered if there is a path (of ordering arcs) in the OG from source to destination. The redundant arcs that are transitively ordered by other control- and data-dependence orderings are discovered and eliminated. This reduces the number of operations required to enforce ordering by approximately 18% versus unoptimized ordering.

To simplify its OG, transitive reduction (TR) is used, which simplifies ordering relation graphs for parallel execution of loops. TR is applied to the OG, which converts a (potentially cyclic) ordering graph into an acyclic graph of strongly connected components (the SCCDAG). Traditional TR eliminates arcs between SCCs, removes all arcs within each SCC, and adds arcs to each SCC to form a simple cycle through all vertices.

The algorithm is modified in two ways to make it work for the OG. First, arcs in the inserted cycle must be compatible with program order instead of being arbitrary. Second, the inserted arcs must respect proper loop nesting, avoiding arcs directly from the inner to outer loop. To handle these arcs, synthetic loop entry and exit nodes are added to each loop (shown as src and sink nodes at the bottom of FIG. 4). Any arc inserted that links an inner loop node to an outer loop node instead uses the inner loop's exit as its destination. Symmetrically, an arc inserted that links an outer loop node to an inner loop node has the inner loop's entry as its destination. With these two changes, the SCCDAG is usable for TR.

However, applying existing TR analysis to the OG fails to preserve the required ordering operations. The problem is that a source and destination may be ordered along one (transitive) path and ordering along another (direct) path may be removed as redundant. Execution along the transitive path enforces ordering, but along the direct path does not, which is incorrect. FIG. 4 shows a scenario wherein path-sensitivity is critical. The path SCC3(S2)→SCC1(L0) should not be eliminated in TR because the alternative path, SCC3(S2)→SCC2(L1)→SCC1(L0) does not capture the direct control-flow path from S2 to L0 via the backedge of the loop. This problem arises due to the steering control and lack of a program counter to order memory operations.

To correctly apply TR to remove redundant ordering arcs, path-sensitive TR is introduced, which confirms that a transitive ordering path subsumes all possible control-flow paths before removing any ordering arc from the OG. With this constraint in place, transitive reduction can be safely used.

Memory operators produce a control token on completion and can optionally consume a control token to enforce memory ordering. The middle-end encodes ordering arcs as defs and uses of data values in the IR (as seen in the IR transform of loads and stores in FIG. 3) before lowering them as dependences in the DFG. For a memory operator that must receive multiple control signals, the middle-end inserts order operations to consolidate those signals.

Control-Flow Operator Insertion. The compiler lowers its IR to use the disclosed control paradigm by inserting control-flow operators into the DFG.

Steer. The compiler uses the control dependence graph (CDG) to insert steers. For each consumer of a value, the compiler walks the CDG from the producer to the consumer and inserts a steer operator at each node along the CDG traversal if it has not already been inserted by a different traversal.

The steer's control input is the decider of the basic block that the steer depends on, and its data input is the value or the output of an earlier inserted steer.

Carry and Invariant. For loops, the compiler inserts a carry operator for loop-carried dependences and an invariant operator for loop-invariant values into the loop header. A carry's data input comes from the loop backedge that produces the value. An invariant's data input comes from values defined outside the loop. These operators should produce a token only if the next iteration of the loop is certain to execute. To ensure this behavior, the compiler sets their control signal to the decider of the block at the loop exit.

Merge. If two iterations of a loop may take different control flow paths that converge at a single join point in the loop body, either may produce a token to the join point first. But for correctness, the one from the earlier iteration must produce the first token. The compiler inserts a merge operator at a join point in the CFG to ensure that tokens flow to the join point in iteration order. The control signal D for the merge operator is the decider of nearest common dominator of the join point's predecessor basic blocks. Because the earlier iteration sends its control signal first and tokens are not reordered, the merge operator effectively blocks the later iteration until the earlier iteration resolves.

Stream Fusion. Target-specific operator fusion is performed on the DFG to reduce required operations and routes by combining value stream generators with loop control logic and address computation logic. Streams are supported and applied for the common case of a loop with an affine loop governing induction variable (LGIV). A stream makes loop logic efficient by fusing the LGIV update and the loop exit condition into a single operator. In the DFG, loop iteration logic is represented by the exit condition, an update operator, the carry for the LGIV's value, and the steer that gates the LGIV in a loop iteration. The middle-end fuses these operators into a single stream operator and sets the stream's initial, step, and bound values. FIG. 3 shows stream compilation, where the operators for loop iteration logic (outlined in blue in the DFG) are fused into a stream operator. Induction-variable analysis is applied to find affine LGIVs. Address computations are also identified and mapped to an affine stream if possible, and the stream is fused into the memory operator.

Mapping DFGs to Hardware. The backend takes a DFG and a CGRA topology description and generates scalar code to invoke a bitstream to configure the fabric. This involves finding a mapping of DFG nodes and edges to PES, control flow modules and links. Mapping can be difficult, and there is much prior work on heuristic methods that trade mapping quality for compilation speed. The disclosed embodiments have two advantages versus the prior art.

First, the disclosed embodiments do not time-multiplex operations, so operations need only be scheduled in space, not time. Prior art compilers unroll loops to reason about operation timing and identify the initiation interval, increasing program size. Second, the disclosed embodiments target energy efficiency, not performance. Rather than optimizing for initiation interval, it need only focus on finding a valid solution, since leakage is insignificant.

Two complementary mappers are provided. One is based on Boolean satisfiability (SAT) and another is based on integer linear programming (ILP) that minimizes the average routing distance. The SAT-based mapper runs quickly, whereas the ILP-based mapper yields an energy savings v. SAT.

The constraints of the ILP and SAT formulations are similar. The formulations ensure that every DFG vertex is mapped to a hardware node, that every edge is mapped to a continuous route of hardware links, and that the inputs and outputs of a vertex match the incoming and outgoing links of a hardware node. They further disallow the mapping of multiple DFG vertices to a single hardware node, the sharing of hardware links by multiple edges with different source vertices, and the mapping of a DFG edge through a control flow module when a DFG vertex is mapped to that module. Together these are the necessary constraints to produce not only a valid mapping, but also a good mapping (SAT is close to ILP in terms of energy).

Microarchitecture

Figure 5:
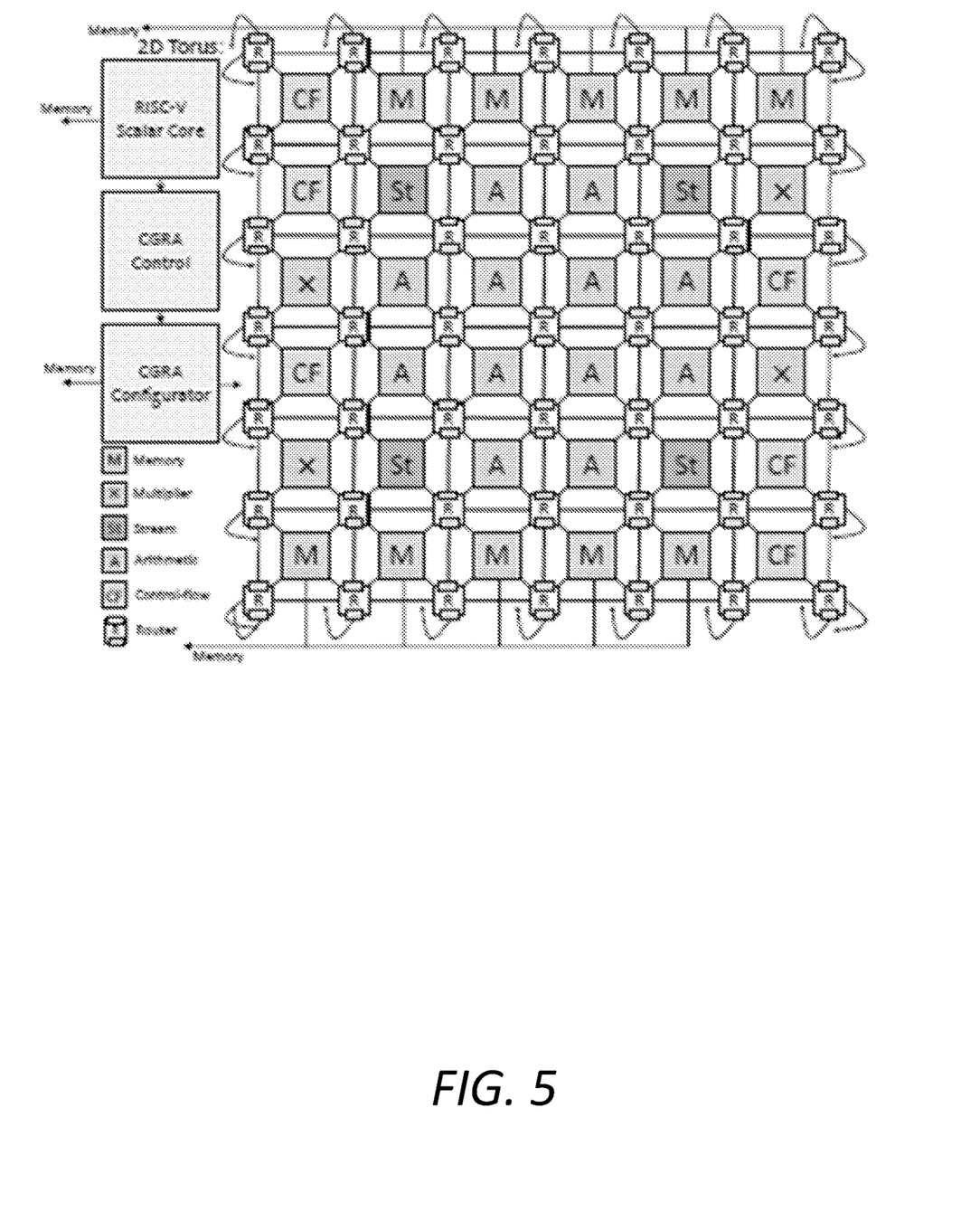
FIG. 5 illustrated the ULP CGRA fabric of the disclosed embodiment.

As shown in FIG. 5, the ULP CGRA fabric of the disclosed embodiments is an energy-minimal coarse-grained reconfigurable array. The 6×6 fabric contains heterogeneous PEs connected via a bufferless, 2D-torus NoC. A complete system in accordance with the disclosed embodiments contains a CGRA fabric, a RISC-V scalar core, and a 256 KB (8×32 KB banks) SRAM main memory.

Tagless Dataflow Scheduling. Asynchronous dataflow firing is implemented via ordered dataflow. Adding ordering operators where control may diverge ensures that tokens always match on arrival at a PE, obviating the need for tags. Tagless, asynchronous firing has a low hardware cost (one bit per input plus control logic), and it allows variable operation latency (e.g., due to bank conflicts) to be tolerated while eliminating the need for the compiler to reason about operation timing.

Figure 6:
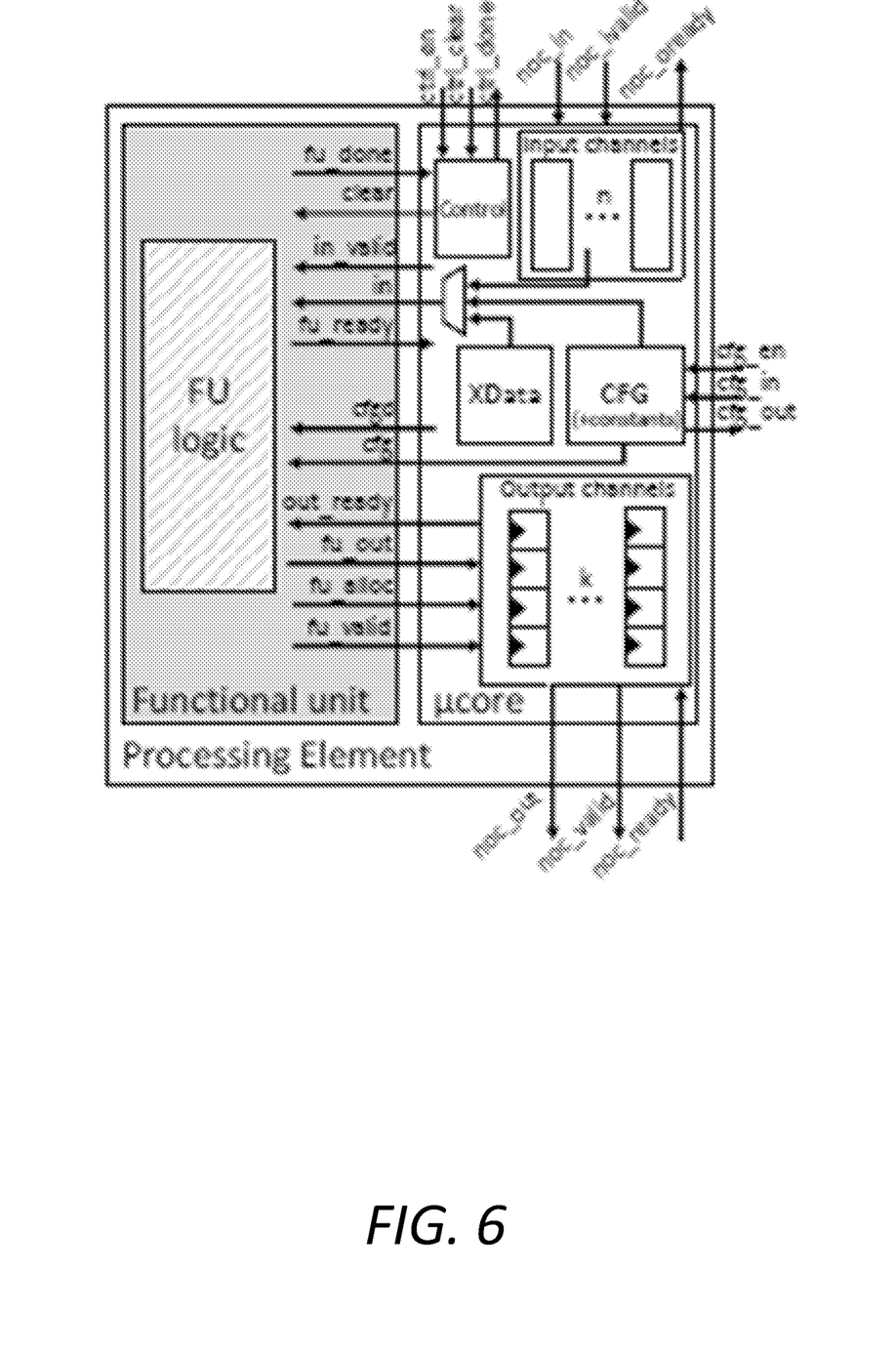
FIG. 6 illustrates the microarchitecture of a processing element.

Processing Elements. The PEs perform all arithmetic and memory operations in the fabric. FIG. 6 shows the microarchitecture of a PE. The PE includes a functional unit (FU) and the μcore. The μcore interfaces with the NoC, buffers output values, and interfaces with top-level fabric control for PE configuration.

Functional Units. The μcore exposes a generic interface using a latency-insensitive ready/valid protocol to make it easy to add new operators. Inputs arrive on in_data when in_valid is high and are consumed when fu_ready is high. The FU reserves space in the output channel by raising fu_alloc (e.g., for pipelined, multi-cycle operations), and output arrives on fu_data when fu_valid is high. out_ready supplies back pressure from downstream PEs. The remaining signals deal with top-level configuration and control.

Communication. The μcore decouples NoC communication from FU computation. The μcore tracks which inputs are valid, raises backpressure on input ports when its FU is not ready, buffers intermediate results in output channels, and sends results over the NoC. Decoupling simplifies the FU.

Configuration. The μcore handles PE and FU configuration, storing configuration state in a two-entry configuration cache that enables single-cycle reconfiguration. Additionally, the μcore enables the fabric to overlap reconfiguration of some PEs while others finish computation on an old configuration.

PE Types. The disclosed embodiments include a heterogeneous set of PEs.

Memory PEs issue loads and stores to memory and have a "row buffer" that coalesces non-aliasing subword loads. Arithmetic PEs implement basic ALU operations (e.g., compare, bitwise logic, add, subtract, shift, etc.); Multiplier PEs implement multiply, multiply+shift, multiply+fixed-point clip, and multiply+accumulate; Control-flow PEs implement the steer, invariant, carry, merge, and order operators, but most of these are actually implemented in the NoC (see below); Stream PEs implement common affine iterators.

Bufferless NoC. PEs are connected via a statically configured, multi-hop, bufferless on-chip network with routers. Instead of buffering values in the NoC, PEs buffer values in their output channel. NoC buffers are a primary energy sink in prior art CGRAs and are completely eliminated here.

Similarly, the NoC is statically routed to eliminate routing look-up tables and flow-control mechanisms.

Figure 7:
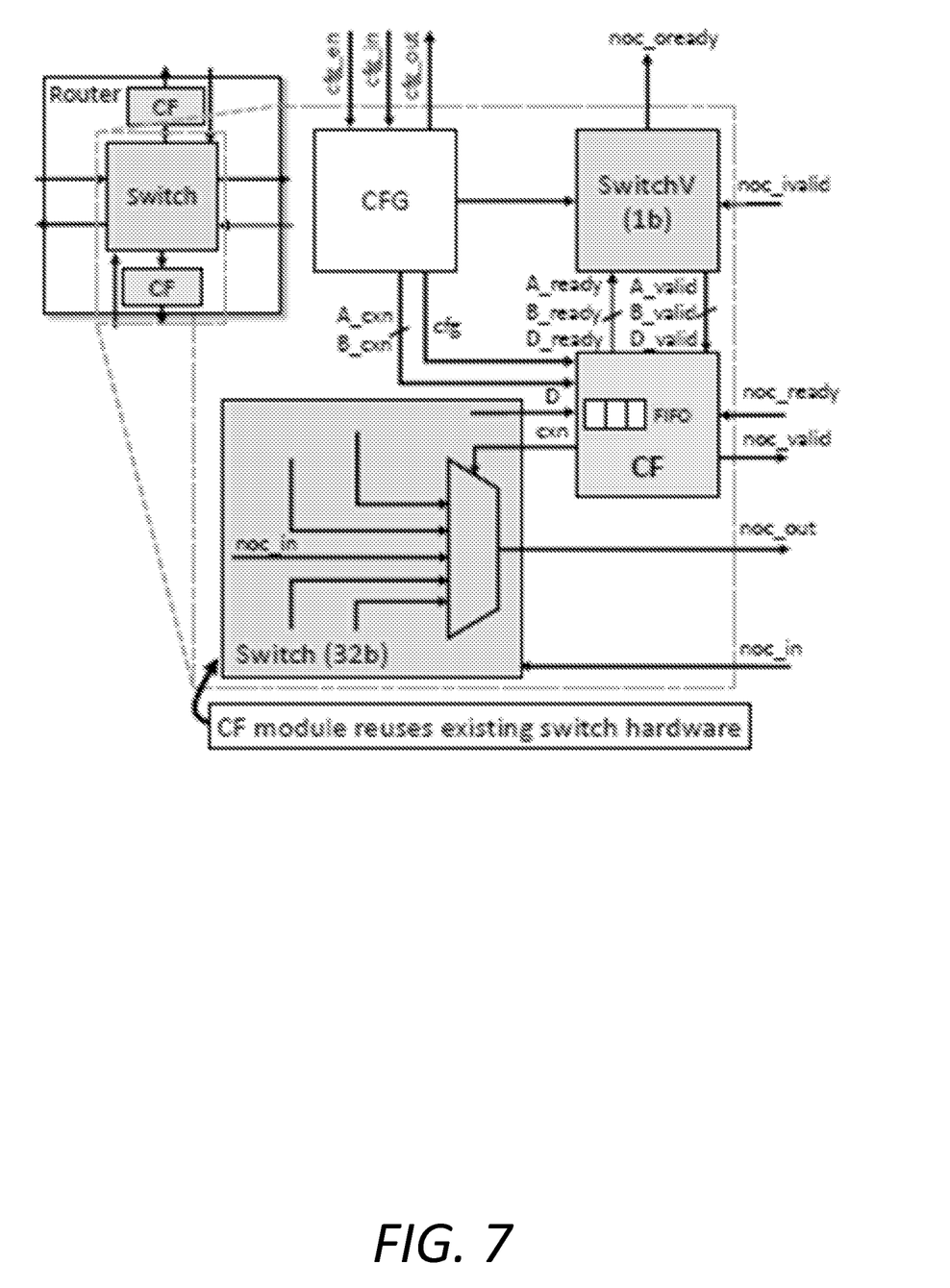
FIG. 7 illustrates the router microarchitecture.

Control Flow in the NoC. Control-flow operators are simple to implement (often a single multiplexer), but there are many of them. Mapping each to a PE wastes energy and area and can make mapping to the CGRA infeasible. Much of the logic required to implement control flow is already plentiful in the NoC. Each NoC switch is a crossbar that can be re-purposed to mux values for control. Thus, to implement each control-flow operator, a switch's routing and ready/valid signals are manipulated to provide the desired functionality. The router microarchitecture of the disclosed embodiments is shown in FIG. 7. The router shares routing configuration and its data and valid crossbars with the baseline NoC. A control-flow module (CFM) is added at a configurable number of output ports (in this case, two output ports). The CFM determines when to send data to the output port and manipulates inputs to the data switch to select which data is sent.

The CFM takes eight inputs and produces five outputs that control router configuration and dataflow through the network. The inputs are: cfg: configuration of the CFM (i.e., opcode); $A_{valid}$, $B_{valid}$, D_valid: whether inputs are valid; D: value of the decider; A_cxn and B_cxn: input ports for A and B; and noc_ready: backpressure signal from the output port. The outputs are $A_{ready}$, $B_{ready}$, D_ready: upstream backpressure signals that allow the CFM to block upstream producers until all signals required are valid; noc_valid: the valid signal for the CF's output; and cxn: which port (A_cxn or B_cxn) to route to the output port on the data switch.

The CFM can be configured for routing or for the control operators previously discussed. For example, out=A is simple: just set cxn=A_cxn, noc_valid=A_valid, A_ready=noc_ready.

Figure 8:
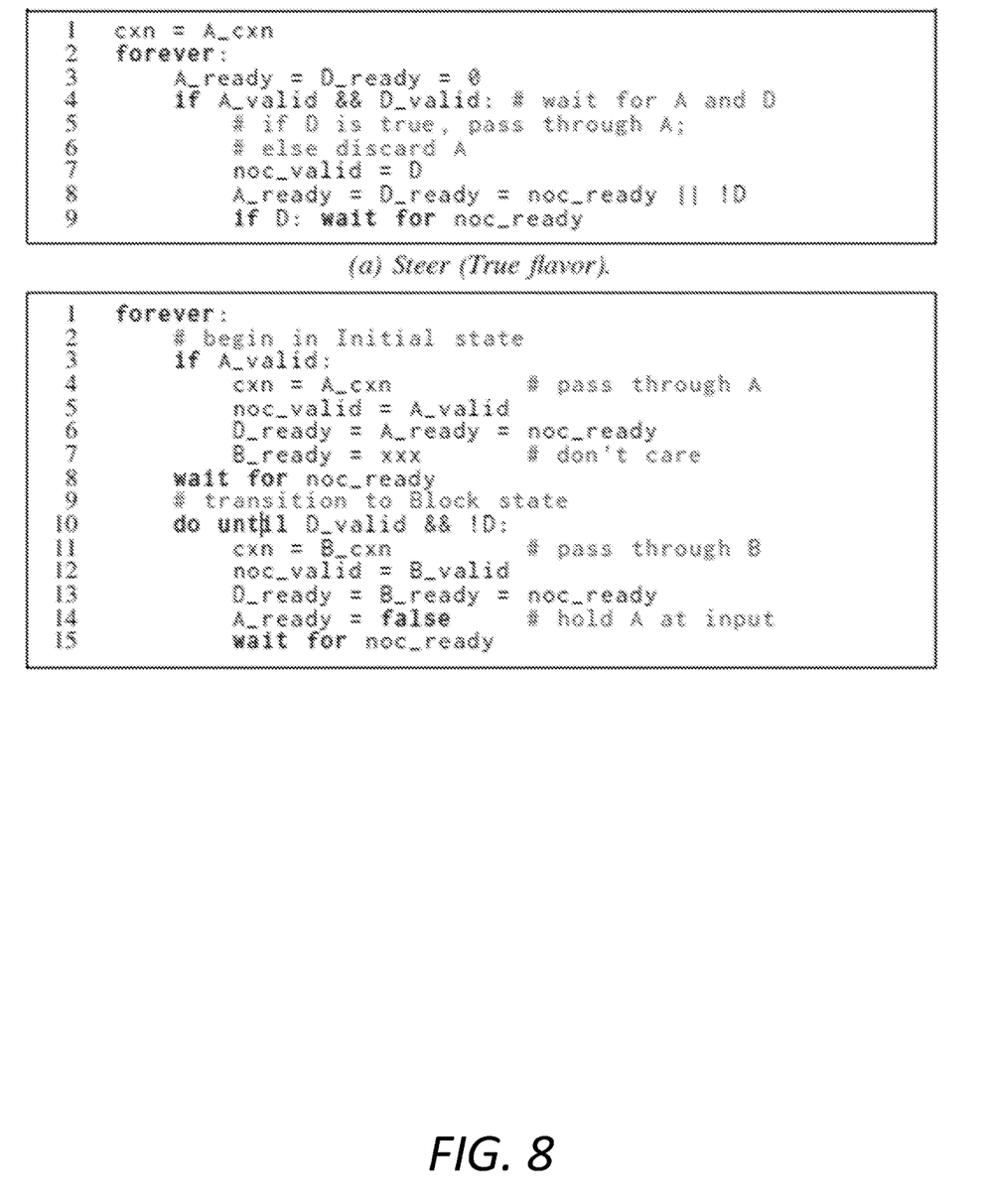
FIG. 8 are pseudocode listings showing implementation of the steer and carry operators.

Other operators are more involved, but each requires only a small state machine. FIG. 8 is pseudocode for the steer and carry operators previously described.

As shown in FIG. 9(a), a steer forwards A if D is true, otherwise it discards A. To implement steer, the CFM waits for A and D to be valid. If D is true, then noc_valid is raised, and the noc_ready signal propagates upstream to A and D and the CFM waits for noc_ready (i.e., for the value to be consumed). If D is false, then noc_valid is kept low, and A_ready and D_ready are raised to discard these tokens.

As shown in FIG. 9(b), carry is more complicated. Carry begins in Initial state waiting for a valid A token. It forwards the token and transitions to Blocked state, where it forwards B until it sees a false D token.

Control flow in the NoC adds small hardware overheads. Implementing control flow in the NoC is far more energy- and area-efficient than in a PE, saving an estimated 40% energy and 22% area versus CGRA with all CF operations mapped to PEs. The CFM deals only with narrow control signals and the 1b decider value D. It does not need to touch full data signals at all; these are left to the pre-existing data switch. Importantly, this means that the CFM adds no data buffers. Instead, the CFM simply raises the *_ready signals to park values in the upstream output channels until they are no longer needed.

By contrast, implementing control flow in a PE requires full data-width multiplexors and, if an entire PE is dedicated to control, an output channel to hold the results. Nevertheless, the disclosed embodiment are sometimes forced to allocate a PE for control flow. Specifically, if a control-flow operator takes a software-supplied value or a constant other than −1, 0, or 1, it requires µcore support.

The CFM provides a small amount of buffering for decider values. This is because loop deciders often have high fanout, which means that the next iteration of a loop is likely blocked by one or more downstream consumers. To remove this limitation, a small amount of downstream buffering for 1b decider signals is provided, improving performance with minimal impact on area. The CFM uses run-length encoding to buffer up to eight decider values with just 3b of additional state, yielding up to 3:8 performance (on dmm) at an area of cost of <1%.

The invention claimed is:

1. A system comprising:
   a processor; and
   compiler software that, when executed by the processor performs the functions of:
      compiling a program written in a high-level language to an intermediate representation;
      enforcing memory ordering on the intermediate representation to create an ordering graph encoding dependencies between memory operations as ordering arcs;
      iteratively pruning the ordering graph to eliminate redundant ordering arcs already enforced by data and control dependencies;
      translating the intermediate representation to a dataflow graph;
      inserting control-flow operators into the dataflow graph; and
      mapping operators in the dataflow graph to a coarse-grained reconfigurable array (CGRA) wherein the control-flow operators utilize logic of an on-chip network of the CGRA to control flow of the program.

2. The system of claim 1 wherein the dataflow graph is optimized before the operators in the dataflow graph are mapped.

3. The system of claim 1 wherein path-sensitive transductive reduction is applied to the ordering graph to convert a potentially cyclic ordering graph to an acyclic graph off strongly-connected components.

4. The system of claim 2 wherein the control-flow operators comprise:
   a steer operator;
   a carry operator;
   an invariant operator;
   a merge operator;
   an order operator; and
   a stream operator.

5. The system of claim 4 wherein the memory ordering is enforced by inserting order operators in the ordering graph.

6. The system of claim 4 wherein the steer, carry, invariant and merge operators are inserted into the dataflow graph.

7. The system, of claim 1 wherein the CGRA comprises:
   a fabric of heterogeneous processing elements connected via a bufferless, 2D-torus on-chip network;
   a RISC-V scalar core; and
   SRAM main memory.

8. The system of claim 7 wherein the compiler uses the dataflow graph and a topographical description of the CGRA to generate scalar code for execution by the scalar core and a bitstream to configure the fabric.

9. The system of claim 8 where the processing elements perform arithmetic and memory operations.

10. The system of claim 7 wherein each processing element comprises:
   a functional unit; and
   a µcore;

wherein the μcore interfaces with the on-chip network, buffers output values and interfaces with top-level fabric control for configuration of the processing element.

11. The system of claim 7 wherein the fabric comprises a 6×6 array of processing elements.

12. The system of claim 7 wherein et processing elements are selected from a group consisting of memory processing elements, arithmetic processing elements, multiplier processing elements, control-flow processing elements and stream processing elements.

13. The system of claim 7 wherein processing elements buffer values in an output channel to reduce buffering values in the on-chip network.

14. The system of claim 7 wherein the on-chip network comprises a plurality of routers coupled to the processing elements.

15. The system of claim 14 wherein the routers include one or more control-flow modules at one of more output ports to implement the control-flow operators.

16. The system of claim 2 wherein the high level language is C and further wherein the intermediate representation is LLVM produced by clang.

* * * * *